United States Patent
Carlson et al.

[15] 3,656,175

[45] Apr. 11, 1972

[54] SEMICONDUCTOR DIODE LASER RECORDER

[72] Inventors: Carl O. Carlson, Los Angeles; Herbert L. Bernstein, Gardena; Albert J. Franco, Los Angeles, all of Calif.

[73] Assignee: The National Cash Register Company, Dayton, Ohio

[22] Filed: June 16, 1969

[21] Appl. No.: 833,272

[52] U.S. Cl. ....................346/76 L, 178/7.6, 331/94.5, 346/108

[51] Int. Cl. ....................G06k 15/02

[58] Field of Search ....................346/76, 108; 95/4.5; 178/7.6, 178/6.7, 7.4; 350/7, 285; 331/94.5

[56] References Cited

UNITED STATES PATENTS

| | | | |
|---|---|---|---|
| 1,852,784 | 4/1932 | Lux | 178/7.6 |
| 3,314,073 | 4/1967 | Becker | 346/76 |
| 3,325,819 | 6/1967 | Fraser | 346/76 |
| 3,334,353 | 8/1967 | Everest | 346/76 |
| 3,349,174 | 10/1967 | Warschauer | 178/7.6 |
| 3,445,786 | 5/1969 | Snyder et al. | 331/94.5 |
| 3,448,458 | 6/1969 | Carlson et al. | 346/17 |
| 3,465,352 | 9/1969 | Carlson et al. | 346/76 |
| 3,475,760 | 10/1969 | Carlson | 346/1 |
| 3,573,847 | 4/1971 | Sacerdoti | 346/76 |

*Primary Examiner*—Joseph W. Hartary
*Attorney*—Louis A. Kline and Joseph R. Dwyer

[57] ABSTRACT

A microimage recording system wherein a semiconductor diode laser is controlled to emit a laser beam which is used to thermally record data on a recording medium. In a first embodiment, the beam emitted by a rectangular shaped junction of a semiconductor diode laser is projected through a suitable optical system including a multi-spirally slotted scanning disc which causes the laser beam to have a scanning action over a moving recording medium for recording highly reduced microimages thereon. In a second embodiment, the beam emitted by each junction of a multijunction semiconductor diode laser is controlled independently thus permitting one or more of the individual junctions to be selectively energized to emit individual laser beams which are directed by suitable optics onto the moving recording medium for the recording of the highly reduced microimages.

10 Claims, 11 Drawing Figures

INVENTORS
CARL O. CARLSON
HERBERT L. BERNSTEIN
ALBERT J. FRANCO

BY Louis A Kline
John T. Mathago
Irving J Levin
THEIR ATTORNEYS

INVENTORS
CARL O. CARLSON
HERBERT L. BERNSTEIN
ALBERT J. FRANCO

BY Louis A Kline
John T. Maclago
Irving J Stern
THEIR ATTORNEYS

INVENTORS
CARL O. CARLSON
HERBERT L. BERNSTEIN
ALBERT J. FRANCO

BY Louis A Kline
John T. Matlago
Irving J Stevens
THEIR ATTORNEYS

INVENTORS
CARL O. CARLSON
HERBERT L. BERNSTEIN
ALBERT J. FRANCO

Louis A Kline
BY John J. Matlago
Irving J Levin
THEIR ATTORNEYS

SEMICONDUCTOR DIODE LASER RECORDER

BACKGROUND OF THE INVENTION

This invention relates to a recording system and more particularly to a microimage recording system wherein a semiconductor diode laser is used to thermally record data on a recording medium.

Techniques for modifying a recording medium with a laser beam are described in the commonly assigned Carlson et al. U.S. Pats. No 3,448,458 issued June 3, 1969, No. 3,465,352 issued Sept. 2, 1969; No. 3,475,760 issued Oct. 28, 1969. The systems disclosed in these patents utilize conventional solid state or gas lasers which of necessity render these systems expensive, bulky, heavy, and dependent upon the requirement of complex modulation and electrical drive schemes. Furthermore in the above mentioned patent applications it is necessary to utilize an electro-optic modulator in order to modulate the output intensity of the solid state or gas laser beam.

The semiconductor diode lasers employed in the present invention represent a highly desirable improvement over the laser recording and display systems provided by the above mentioned patent applications in that such diode lasers are much smaller components that can be more readily incorporated in usable equipment which can operate in conditions of extreme shock and vibration and are less subject to being affected by environmental conditions provided they are properly cooled. Furthermore the beam emitted by the semiconductor diode laser in the present invention can be modulated directly and easily at electronic speeds without the need for an additional modulator device. The semiconductor diode lasers as disclosed herein are typically comprised of a planar P-N junction layer having a thickness of 1 to 10 micrometers formed in a single crystal of semiconductor material which may be, for example, gallium arsenide or gallium arsenide phosphide. Coherent light is emitted from the diode when forward current on the order of 2 to 200 amperes, flows across the junction. When so energized, a sufficient number of electrons are pumped up to the conduction energy band or upper impurity levels to produce a population inversion within the crystal which causes electrons to be stimulated to recombine with holes in the valence band or lower impurity levels. Stimulated emission or lasing thus occurs when the population inversion obtained provides sufficient optical gain to overcome any optical losses, and this occurs when the threshold current value is applied through the junction. Two parallel end faces normal to the P-N junction plane are precisely cleaved so as to form a cavity and to enhance the optical gain in the diode so that coherent light is emitted through the end faces.

Prior to the present application, the light emitted from a semiconductor diode laser has not been considered to have practical uses comparable with those of solid state or gas lasers due mainly to the relatively large divergence angle of the former which is on the order of 10° to 20° and occurs because the thin junction layer acts as a diffracting slit for the emitted light. However such divergence angles can be appreciated as being practical when considering the small slit from which the laser beam is emitted, and appropriately designing the associated optical system to operate with a beam having such a wide divergence angle. In fact, as disclosed by the present application, such diode lasers compare favorably to gas lasers in thermal microimage recording applications provided a substantial amount of the energy emitted from the diode laser is captured by an optical system and properly concentrated for the recording application.

Furthermore, a semiconductor diode laser can be shown to exhibit image resolution performance which is competitive with rod and gas lasers by examining the spot sizes produced by the respective lasers. This calls for the investigation of the respective "figures of merit" which involves comparing the products of the beam diameter and the tangent of half the divergence angle of the laser diode and a gas or solid state laser. Since the sizes of the spots produced and recorded on the recording medium by both types of lasers are of the same magnitude and result in image resolution at the recording medium being the same, it can be seen that a diode laser can be used as a replacement for conventional solid state rod and gas lasers in many recording applications.

SUMMARY OF THE INVENTION

Whereas in previously described methods of conventional laser recording, the systems comprise a bulky arrangement including rod or gas lasers employing modulators and high speed line scanning obtained by employing a high inertia motor driven polygon mirror, for example, the preferred system of the present invention is of limited size in that it includes a directly controlled semiconductor diode laser which requires either a very simple scanning device or no scanning device for performing the thermal recording of data. Thus in one embodiment of the invention substantially all of the widely divergent energy of the beam emitted from a small rectangular shaped junction of a diode laser is captured and projected through an optical system. In this embodiment, the providing of a scanning motion to the projected highly reduced images of the junction to thermally record microimages on a recording medium is accomplished by the utilization of a low inertia rotating scanning disc with a serial arrangement of transparent slits provided near the periphery thereof. In a second embodiment of the invention, substantially all of the widely divergent energy, emitted from one or more sections of an array of diode lasers or from an energized section of a diode laser with a plurality of small rectangular or square shaped spaced junctions, is captured and similarly passed through an optical system to project the highly reduced images of the junctions to thermally record microimages on a recording medium. In this latter embodiment, directing of the laser beam onto different portions of the recording medium is provided for by pulsing each spaced junction independently in a parallel or sequential arrangement. Such an arrangement reduces the complexity of the system by avoiding the need for high speed mechanical beam deflection devices and in construction such a diode laser can be considered an optical head having operational features similar in some respects to a magnetic head as used in magnetic recording systems.

These features as well as other features and advantages of the present invention are more specifically described in the following detailed description and drawings wherein.

DETAILED DESCRIPTION

Figure 1:
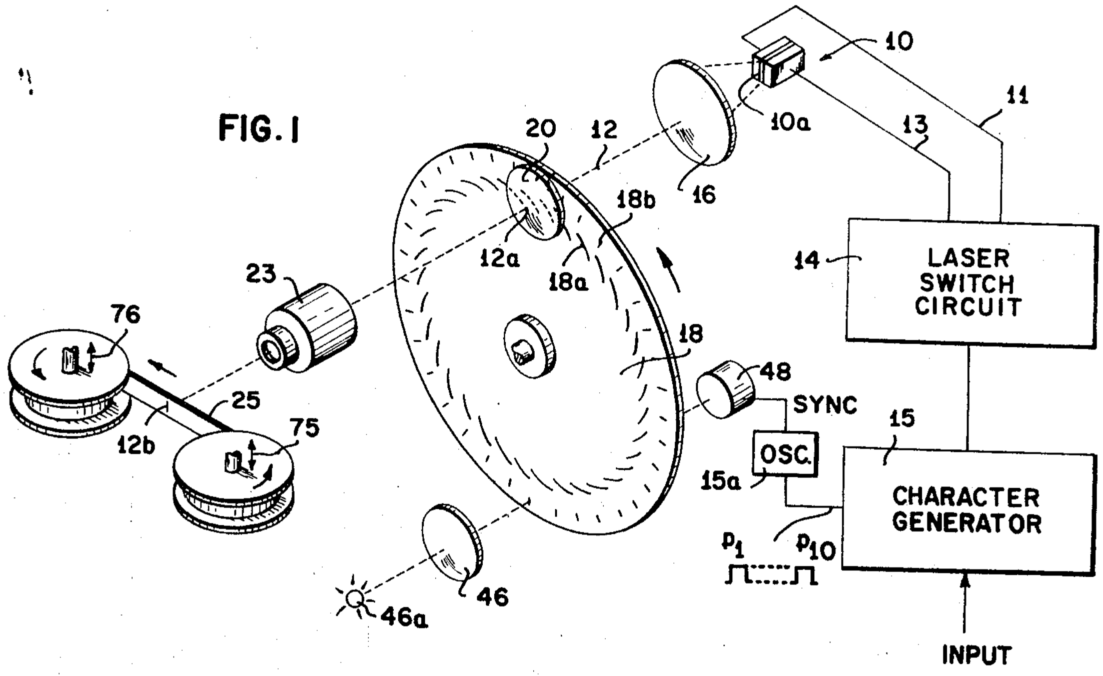
FIG. 1 is a schematic view showing a laser recording system in accordance with the present invention.
Figure 7:
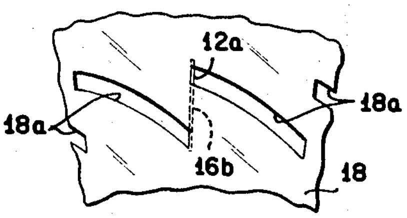
FIG. 7 shows a fragmentary portion of the scanning disc with the arrangement of two of the slits thereon as utilized in accordance with the present invention.
Figure 6:
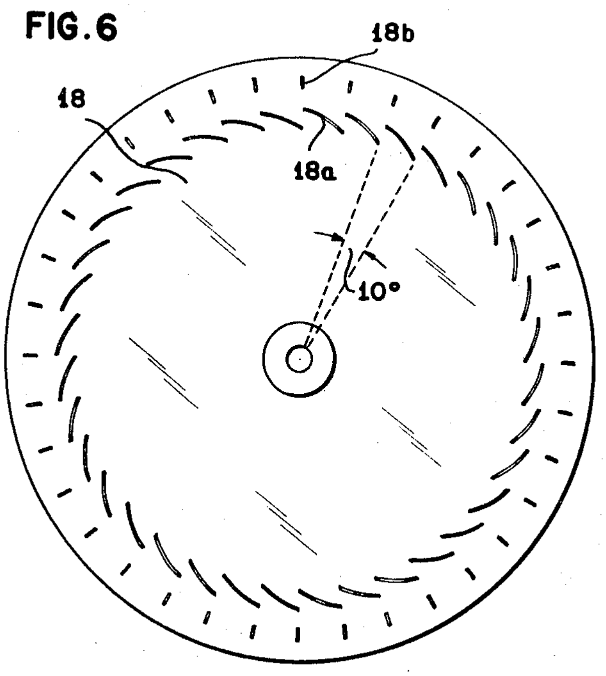
FIG. 6 shows the scanning disc and the detailed arrangement of the slits thereon as utilized in accordance with the present invention.

Referring to FIG. 1 of the drawings, a semiconductor diode laser 10 is illustrated, greatly enlarged, in a microimage recording system. Diode laser 10 is a light emitting semiconductor diode which can be operated at room temperature when provided with a heat sink as well known in the art. As more particularly shown in FIG. 4, the diode laser 10 has end surfaces 33 and 35 which are precisely cleaved so as to form a mirror cavity which internally reflects the light as required for the lasing action. Laser light beam 12 is emitted, at a divergence angle $\alpha$ which may be on the order of 10° to 20°, from the approximate region of the P-N junction 10*a* which is the edge of a plane extending through the diode and which has an emitting area that is rectangularly shaped with typical dimensions of 10 micrometers by 100 micrometers. In order to capture nearly all of the widely divergent light energy emitted in pulsed or continuous wave fashion from diode laser 10, it is necessary that collecting lens 16 have a sufficiently high numerical aperture. Typically, lenses having numerical aperture values of 0.20 and higher are used and the resultant working distance depends on the lens diameter in a manner well known in the art. Collecting lens 16 captures substantially all the emitted coherent radiation and images the rectangular laser junction 10*a* onto the rear surface of a rotating scanning disc 18 to form thereon line image 16*b*, shown in FIG. 7, which is magnified approximately 10 times. The opaque scanning disc 18, which is more specifically shown in FIG. 6 and FIG. 7, has 36 curved 0.1 millimeter wide transparent curved slits 18*a* equally spaced near its periphery which permit the radiation from only a small segment 12*a* (FIG. 3) of the magnified image 16*b* of the laser junction 10a to pass on at a given instant through the system. Slits 18*a* preferably have a spiral of Archimedes curvature as shown in FIG. 6 and FIG. 7 in order that they can sweep across the magnified line image 16*b* of the diode junction 10*a* in a sawtooth manner, to thus pass segment 12*a* which forms a laser beam spot sweeping in essentially a vertical fashion across field lens 20. Spot 12*a* is moved down in a sawtooth fashion by scanning disc 18 so as to cover the height of the desired data to be recorded under control of the laser switch circuit 14 on the recording medium 25. The spot of light passed through the scanning disc 18 fills the recording lens 23 which has a high numerical aperture that may typically be 0.85 or higher and which concentrates and focuses the beam such that it is thermally recorded on recording medium 25 as a spot 12*b* (FIG. 1) which is a highly reduced image of a portion of the junction 10*a*. The recording medium 25 is shown to be typically a moving tape which may be made of a transparent substrate base with a thin film surface comprised of a carbon dispersion in a plastic binder deposited thereon to a thickness on the order of one micrometer. The mechanical driving arrangement for the recording medium 25 may be similar to the arrangement utilized with a magnetic tape drive in a manner well known in the art.

Figure 4:
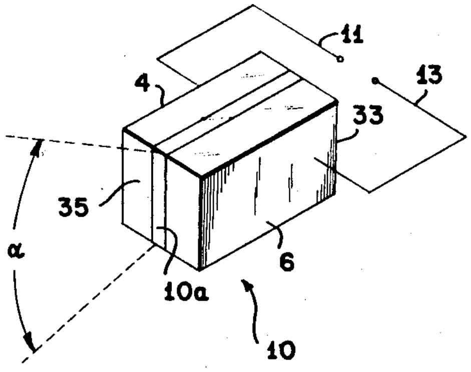
FIG. 4 is a greatly enlarged view of a single junction semiconductor diode laser utilized in accordance with the present invention.

The semiconductor diode laser 10, as shown in FIG. 4, has electrical connections on side surfaces 4 and 6 such that current flows transversely through junction plane 10*a*. When the current is at a sufficiently high level, the photon energy in the mirrored cavity of the diode bounces back and forth between the mirror end surfaces 33 and 35 and stimulated or lasing emission occurs. The diode laser is energized by laser switch circuit 14 which provides the necessary laser drive current through leads 11 and 13. The laser switch circuit 14 (FIGS. 1 and 2) is controlled by character generator 15 which may be a circuit arrangement well known in the art and which is used to cause the semiconductor laser 10 to be energized at the appropriate times during the scanning motion in accordance with the data to be recorded. The character generator 15 is controlled by a binary input which may typically be a computer output or a data source.

Synchronization pulses are provided through the combined action of light source 46*a*, lens 46, the 36 linear slits 18b and photodetector 48 so that the control of diode laser 10 is referenced at the top of a scanning line as represented by line image 16b (FIG. 7), and continued from line to line. The linear slits 18b are arranged such that a synchronizing pulse is applied through oscillator 15*a* to the character generator 15 just before a new curved slit 18*a* will start exposing the magnified junction image 16*b* as shown in FIG. 7. The oscillator 15*a* cycles upon being energized by the synchronization pulse and by cycling through pulses $p_1$ to $p_{10}$, for example, permits the diode laser 10 to be pulsed by the laser switch circuit 14 during the exposure of line image 16*b* by curved slit 18*a* so as to divide each line of the scan into ten successive portions. In this manner registration can be insured at the start of each scanning line by diode laser 10. The semiconductor laser diode may be such that it is continuously energized or discretely pulsed during the scanning procedure and any portion of the scan line can be suppressed by the selective controlling of the energization of the diode laser by character generator 15 during a p pulse period.

The optical system, in which each lens is itself conventional, provides a novel combination which is capable of efficiently projecting the output of the diode laser as highly reduced spots of 2 micrometers or less which can be controllably scanned so as to form a two dimensional line by line microimage scanning pattern on the moving recording medium 25 having a flat field of, for example, 1 mil by 1 mil. Since the laser output energy, aside from transmission losses, is converted to small spots by means of the optical system which performs an overall area reduction of typically 25 times from the energy source, i.e., junction 10*a*, to the recording medium 25, the laser energy per unit area supplied to the recording medium 25 is unusually large. Accordingly, it becomes possible, by proper choice of the recording medium 25, to cause the highly reduced spot of 2 micrometers or less to effect a wide variety of reproducible changes in the recording medium 25.

Figures 8, 10:
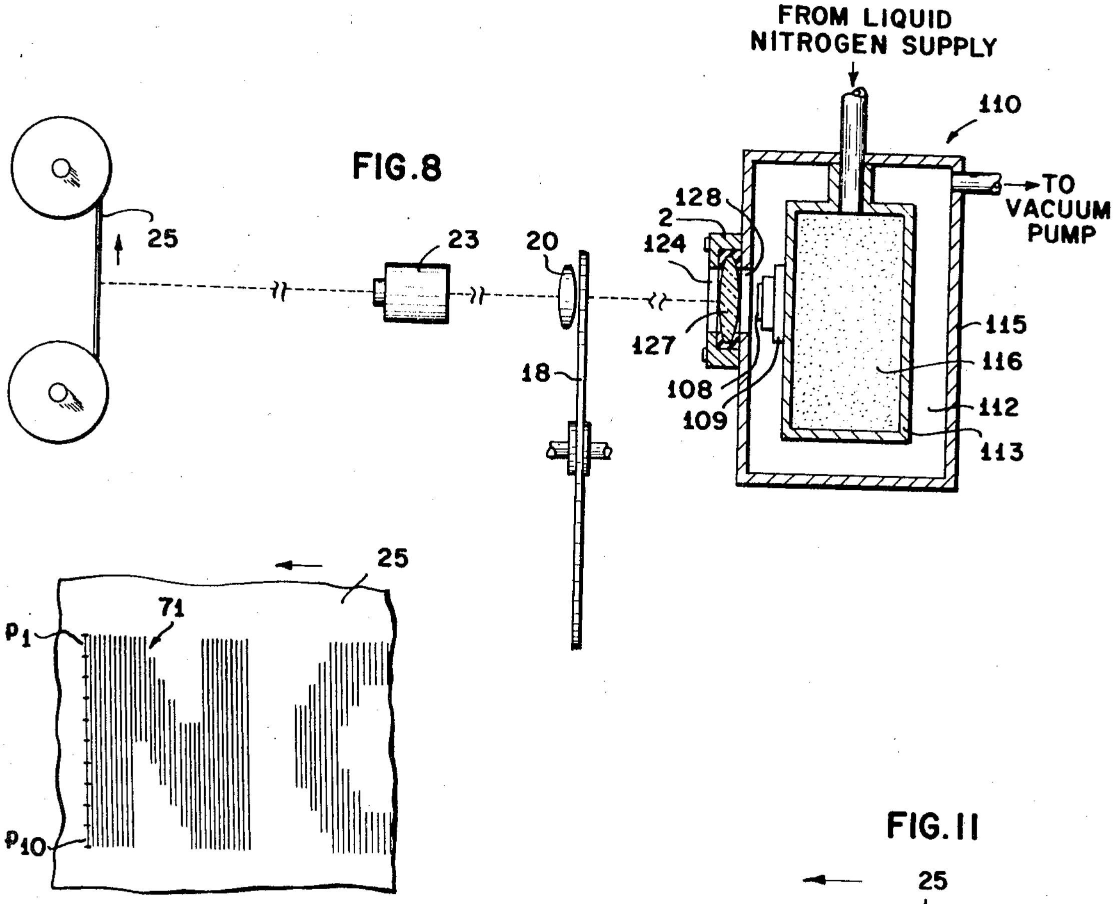
FIG. 8 is a schematic view showing another embodiment of a laser recording system in accordance with the present invention.
FIG. 10 shows a greatly enlarged fragmentary view of the recorded area of the recording medium illustrating a character recorded thereon by the recording system shown in FIG. 1.
Figure 9:
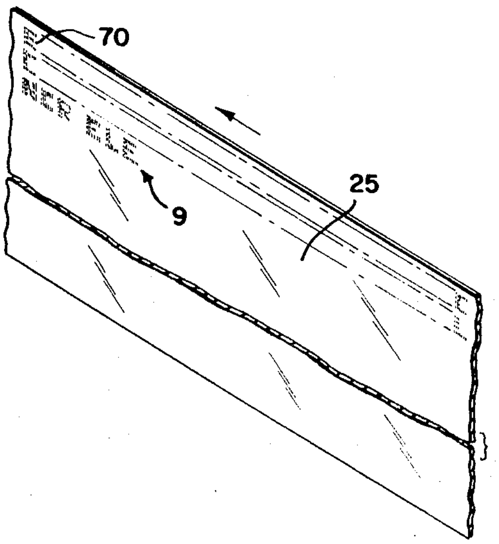
FIG. 9 illustrates a typical recording medium having a plurality of characters recorded thereon, in accordance with the present invention.

The remarkably high recording bit storage density capability of a system in accordance with the invention can be appreciated by reference to FIG. 9 which illustrates a greatly enlarged view of recording medium 25, typically shown as a moving tape having a plurality of rows each having micro recordings of characters 70 recorded thereon. It should be appreciated from the above that the data recorded on the recording medium may typically be pictorial or other forms of data which can be represented by a digital recording. Thus on a small area of the recording medium it is possible to form a large plurality of high resolution microimages each having a reduction ratio that may be typically greater than 100 to 1. Each of the characters 70 on a typical row 9 is recorded on an area that is approximately 1 mil by 1 mil and is formed by scanning the area by the laser beam focussed down to a 2 micrometer width. In FIG. 10 is shown a greatly enlarged view of one of the characters 71 recorded in the row 9 by the embodiment shown in FIG. 1. Each of the scan lines of character 71 is comprised of typically as many as 10 segments $p_1$ to $p_{10}$ which are shown as just touching and which correspond to the permissible segmentation of a line image 16*b* provided by the pulsing of diode laser 10 by the action of oscillator 15*a* and character generator 15 during the exposure of junction image 16*b* by curved slit 18*a*. Also, in the event the laser is a continuous wave device, the scan lines will be continuous except where it is not desired to record in which case a portion of the scan line may be suppressed by not energizing the diode laser for a predetermined portion of the scan line. It can be seen that the diode laser is only energized, either continuously or discretely pulsed, for the time during each scan that it is desired to record on the recording medium. The microimages produced by this process may be enlarged and viewed on a screen in a manner shown in FIG. 2 and explained below and the microimages may also be reviewed externally by means of a microimage reader such as is described in U.S. Pat. No. 3,267,801. One row of tape 25 is recorded across the length of the moving tape and when it is desired to commence a new row, the tape is shifted upwardly a fixed distance as schematically indicated by arrows 75 and 76 in FIG. 1. A row typically takes up two mils of space in which the recorded medium uses 1 mil of this space which provides an easily read size enlargement when used with a 115x or 150x microimage reader. Thus on a one-half inch wide tape, 150 channels can be readily recorded.

In FIG. 8 there is shown another embodiment of the laser recording system in which the diode laser is designed for operation at liquid nitrogen temperatures. The difference between a diode laser designed for room temperature operation and for liquid nitrogen operation is based on the thermal conductivities of the materials used in the construction of the diodes and of the heat sinks used. Typically, beryllium oxide is a good heat conductor at liquid nitrogen temperatures but unsatisfactory at room temperatures while the converse is true for a diode laser with molybdenum soldered to the chip. Diode operation at lower temperatures results in lower required threshold currents and increased external efficiency.

Housing 110 is a double walled container in which the area 112 between the two walls 113 and 115 is maintained at a vacuum and the area 116 is supplied with liquid nitrogen which is at a temperature of 77° K. Diode laser 108 is mounted in vacuum area 112 on a heat sink 109 and is located adjacent an opening 128 in wall 115 such that liquid emitted from the diode laser 108 passes through opening 128. Cover 2 encases opening 128 and is hermetically fitted so as to maintain the vacuum in area 112. Cover 2 also supports collecting lens 127 which captures substantially all the light emitted by the diode laser 108 and transmits it through an opening 124 in cover 2 to scanning disc 18 and through lenses 20 and 23 to be recorded on recording medium 25 as previously described.

Figure 2:
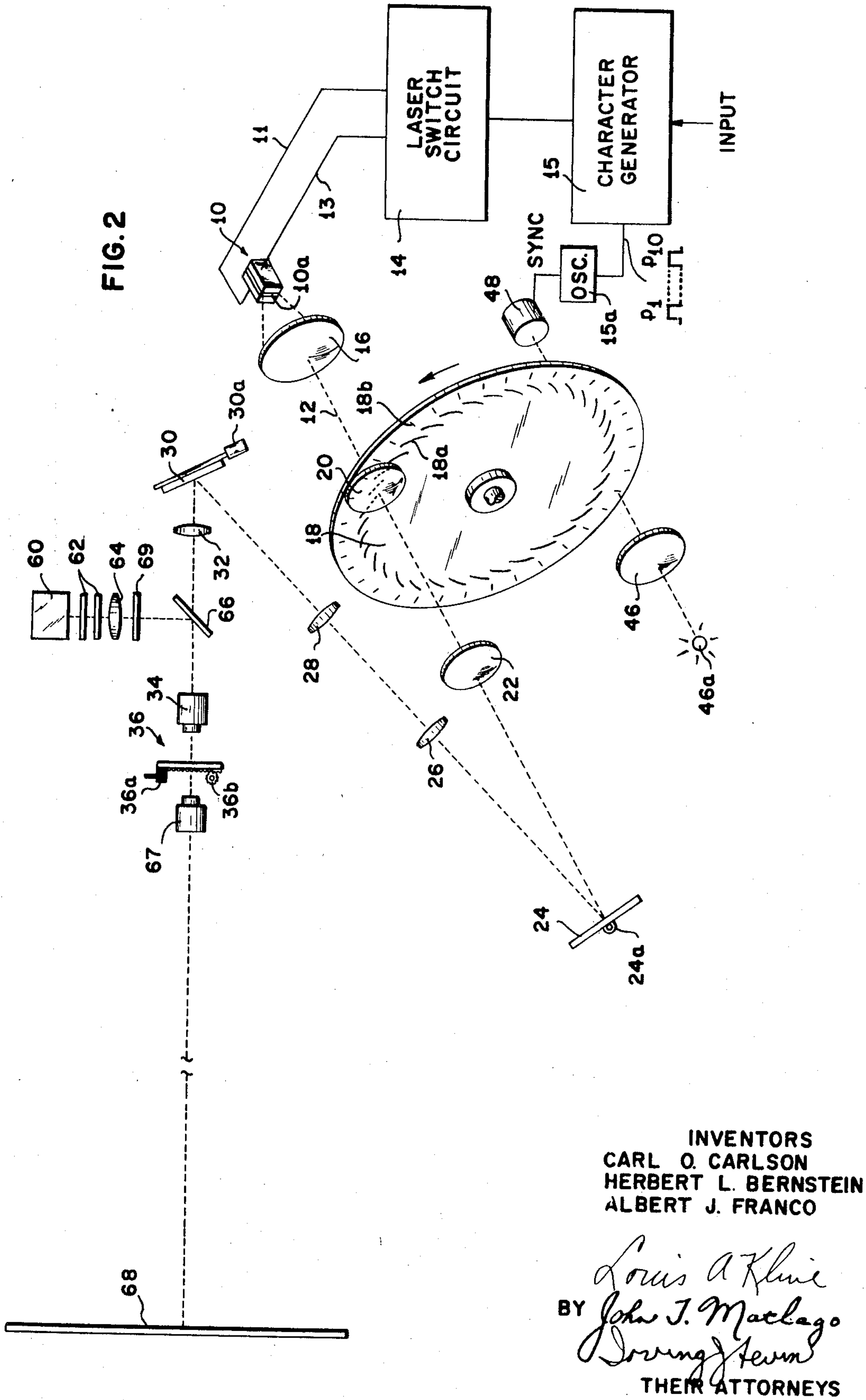
FIG. 2 is a schematic view showing a laser recording system in accordance with the present invention, similar to FIG. 1, but including certain modifications to enable the recorded information to be displayed on a screen.

Turning now to FIG. 2, a diode laser is shown in a combination recording and display apparatus in a system typical of the usages to which a diode laser may be put. Diode laser 10 is pulsed by laser switch circuit 14 and the magnified image 16*b*, shown in FIG. 7, of diode junction 10a is formed by collecting lens 16 and projected on the rear surface of the rotating scanning disc 18 as previously stated in the description of FIG. 1. Collecting lens 16 is selected and positioned so as to intercept essentially all the emitted energy of the diode laser 10. Scanning is achieved through the action of transparent slits 18*a* which permits the radiation from only a small segment 12*a* of the magnified image 16*b* of the rectangular junction 10*a* of diode laser 10 to pass on through the optical system. The light output from the diode laser 10 that is transmitted through disc 18 is represented by a spot sweeping in essentially a vertical fashion across field lens 20. The beam 12 is then projected by relay lens 22 toward horizontal positioning mirror 24, which reflects the beam into a field lens 26. From field lens 26 the beam is directed through relay lens 28 and reflected off vertical positioning mirror 30 from which the beam is further directed into field lens 32 and then relayed by recording lens 34 onto a recording medium 36 which may typically be a transparent substrate having a thin film surface formed of a material such as bismuth. Mirrors 24 and 30 by means of their gear arrangements 24*a* and 30*a* initially position the laser beam to a recording field located at a specific location on the recording medium 36 where scanning of the laser beam is to take place. Also, mirror 24 is controlled during the recording operation to produce a small horizontal sweeping motion to cause a small raster of vertical scans to form across the field where scanning takes place. The gears 36*a* and 36*b* are utilized to reposition or advance the recording medium 36 so as to provide a fresh supply of recording material within the range of the optical system. Control systems for tilting the mirrors and positioning the recording medium have previously been described in the aforementioned application of Carlson et al., No. 646,561, now U.S. Pat. No. 3,448,458.

For displaying data recorded on medium 36, a projection mechanism as shown in FIG. 2 is provided. This mechanism includes a light source 60 directing a light beam through a set of removable filters 62 for filtering out any frequencies of the light source that might have a deleterious effect on the recording medium 36 and then through a condenser lens 64. The light is directed from condenser lens 64 toward a dichroic beam combiner 66 where it is reflected toward the pupil of recording lens 34. The projection light is then passed through the recording medium 36 and the image contained thereon is cast into a projection lens 67 which directs the image bearing light beam onto a display screen 68. It may be desired to project a stationary reference may or the like onto the viewing screen to provide a background for the displaying characters. Such can be introduced by transparency 69 positioned immediately following lens 64 as shown in FIG. 2. Other types of laser recording and display systems can include film deformation techniques wherein a thermoplastic film can be deformed without having to provide an electrical charge pattern. Erasing of the film deformation recording is accomplished by recording over the character to be erased with a much smaller line spacing. This type of recording is described in the above mentioned Carlson application, No. 585,060, now U.S. Pat. No. 3,475,760.

Figures 3, 5:
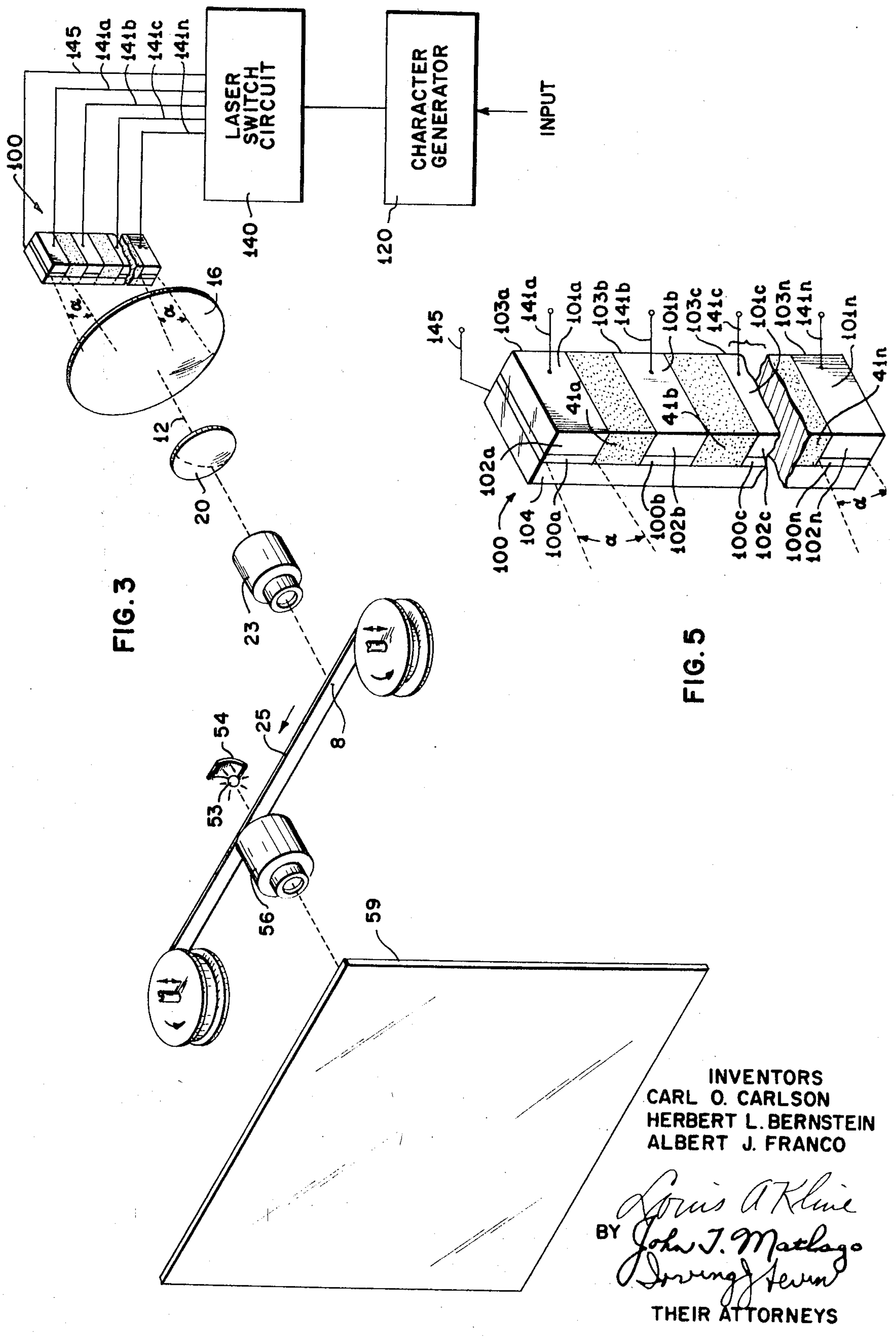
FIG. 3 is a schematic view showing another embodiment of a laser recording system in accordance with the present invention.
FIG. 5 is a greatly enlarged view of a multi-junction semiconductor diode laser utilized in accordance with the present invention.

Turning now to FIG. 3 and FIG. 5, the system of the second embodiment of the present invention is shown as provided with a diode laser 100 which is shown greatly enlarged. In the construction of diode laser 100 a multiplicity of single junction diode lasers are manufactured from on semiconductor chip or many chips are combined through the application of integrated circuit or other manufacturing techniques and each diode segment has an individually energizable junction 100*a*–100*n* where junction 100*n* represents the last junction on a chip containing, for example, as many as 50 to 100 junctions. Each of the individual diode segments 101*a*–101*n* has its front surfaces 102*a*–102*n* and rear surfaces 103*a*–103*n* precisely cleaved so as to form individual laser cavities. Between the diode segments 101*a*, 101*b* and 101*n* are insulating materials 41*a*, 41*b*, and 41*n* to keep the segments of the diode laser 100 from shorting out upon selective energization. This would be necessary if the multi-junction diode laser is made by combining many chips together. Another method to keep the individual diode segments 101*a*–101*n* from shorting is to etch or cut out the areas indicated by insulating materials 41*a*, 41*b*, and 41*n*. This would be the case if the diode laser 100 was made from one chip.

Current in diode laser 100 passes through one of the diode segments 101*a*–101*n*, through the respective one of the junctions 100*a*–100*n* and out of a layer 104 of semiconductor material common to all of the sections. In this manner it is possible to pulse only one section of diode laser 100 at a time. This permits parallel or sequential pulsing of the individual diode segments and reduces laser drive requirements since it is not necessary to cause all the junctions to lase in order to make use of the diode laser as a source.

The individual diode segments 101*a*–101*n* are selectively pulsed by laser switch circuit 140 through leads 141*a*–141*n* and 145. Character generator 120 controls the laser pulses 140 and an external binary input which may typically be a computer output, controls the character generator 120.

Light energy is emitted with divergence angle $\alpha$ from one or more of the junctions 100*a*–*n* that are pulsed by the laser switch circuit 140 and the magnified image of the pulsed junction is projected by collecting lens 16 onto field lens 20. In order to capture essentially all of the light energy emitted from the individual pulsed segments of diode laser 100, it is necessary that collecting lens 16 have a sufficiently high numerical aperture. Typically, lenses having numerical aperture values of 0.20 and higher are used and the resultant working distance depends on the lens diameter in a manner well known in the art. Field lens 20 acts to project the light from the magnified image to fill recording lens 23 which has a typical numerical aperture of 0.85 or higher. Lines 8 which are the images of the energized junctions are recorded by the heating effect upon a recording medium 25 shown typically as a moving tape as discussed for FIG. 1.

Figure 11:
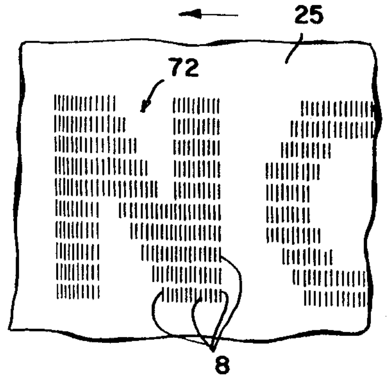
FIG. 11 shows a greatly enlarged fragmentary view of the recorded area of the recording medium illustrating a character recorded thereon by the recording system shown in FIG. 3.

In FIG. 11 a greatly enlarged partial view is shown of the recording medium 25 having a microimage recording thereon as provided by the multi-junction semiconductor diode laser 100 of FIG. 3. In particular, a plurality of rectangularly shaped recorded lines 8 comprising character 72 are shown representing the recorded images of a typical diode laser having 10 parallel junction segments that were all or selectively pulsed at successive instants as the recording medium was moved past the diode laser 100.

Returning to FIG. 3, after the information is recorded on the recording medium 25, viewing of the information is made possible by light source 53 in combination with reflector 54 which projects a beam of light through the transparent recorded microimages 72 (FIG. 11) which have been previously thermally recorded on medium 25. The light transmitted through the recording medium 25 is projected by readout lens 56 to the rear projection screen 59 for viewing.

A combination recording and display arrangement as shown in FIG. 3 and described above is particularly useful in a system wherein it is desirable to view what has been recorded and to also keep a permanent record of the information for retrieval at a later time. One typical usage of such a system is in a ticker tape device for use in a stock quotation system. In this system using the multi-junction diode laser, and assuming scan pulsing of the junctions, the recording medium is moving at a velocity of one junction width per scan at right angles to the direction of the scan so that the recording medium will have a uniformly recorded area. As the recording medium moves along, viewing occurs in the manner already described.

It is understood that various other omissions, substitutions and changes in the form and details of the systems illustrated and in their operation may be made by those skilled in the art without departing from the scope and spirit of the invention. It is the intention, therefore, to be limited only as indicated by the following claims.

What is claimed is:

1. In a laser recording system, a semiconductor laser means having a light emitting junction of small dimensions, a recording medium, control means including pulsing means for selectively energizing said semiconductor laser means, an oscillator having a cyclical pulse output, scanning means including rotating scanning disc having a plurality of light-transmissive slots, optical means including means for projecting an image of said junction onto the slots of the rotating scanning disc to thereby form a fosussed spot scanning pattern which is imaged onto said recording medium, and synchronizing means initiating said oscillator at the beginning of each scan of the laser beam, and wherein said control means responds to the cyclical pulse output of the oscillator to control the selective energization of the semiconductor laser means during each scan of the laser beam.

2. The invention in accordance with claim 1 wherein said semiconductor laser means is contained within a housing having an inner section maintained at a low temperature, and an outer section maintained under vacuum, and said semiconductor laser means is maintained at a safe operating temperature by mounting said laser means in said vacuum section on the wall of said inner section.

3. The invention in accordance with claim 1 wherein said semiconductor laser means is a gallium arsenide diode having at least one junction providing said laser beam when energized.

4. The invention in accordance with claim 1 wherein said recording medium comprises a transparent substrate provided with a coating of a carbon dispersion in a plastic binder.

5. The invention in accordance with claim 1 wherein the optical means causes the image of the junction area of the semiconductor laser means focussed on the recording medium to be reduced on the order of at least 25 times.

6. The invention in accordance with claim 1 including display means for displaying the recordings on said recording medium, said display means including a viewing screen, a projection light source, means for projecting light from said light source through the recording medium, and a projection lens system for projecting the light passed through the recording medium onto said viewing screen.

7. In a laser recording system, a semiconductor laser means having a plurality of semiconductor diode laser segments arranged in a row, each of said segments having a junction formed by integrated circuit techniques on a single semiconductor chip, means isolating the area between adjacent semiconductor diode laser segments to prevent said segments from shorting out upon selective energization of the junctions, a recording medium, control means including generation means for simultaneously energizing selected junctions of said semiconductor laser means to cause laser beams to be emitted from respective ones thereof in accordance with a desired recording to be produced on the recording medium, and optical means for projecting and focussing the individual images of the laser beam emitted by said junctions onto selected portions of said recording medium to form recordings thereon.

8. The invention in accordance with claim 1 wherein said semiconductor laser means is provided with a rectangular junction, wherein said scanning means comprises a rotating scanning disc having a plurality of spirally formed light-transmissive slots located near its periphery, and wherein said optical means includes means for projecting an image of said rectangular junction onto the spiral slots of the rotating scanning disc to thereby form a focussed spot scanning pattern which is imaged onto said recording medium.

9. The invention in accordance with claim 7 wherein said semiconductor laser means is formed by assembling a plurality of individual semiconductor laser diodes in a row.

10. The invention in accordance with claim 7 wherein each semiconductor laser means is provided with as many as 50 to 100 light emitting junctions.

* * * * *

UNITED STATES PATENT OFFICE

CERTIFICATE OF CORRECTION

Patent No. 3,656,175 Dated April 11, 1972

Inventor(s) Carl O. Carlson et al

It is certified that error appears in the above-identified patent and that said Letters Patent are hereby corrected as shown below:

Column 5, Line 33 change "liquid" to --light--

Column 6, Line 18 change "may" to --map--

Column 6, Line 19 change "displaying" to --displayed--

Column 6, Line 34 change "on" to --one--

Signed and sealed this 12th day of December 1972.

(SEAL)
Attest:

EDWARD M.FLETCHER,JR.
Attesting Officer

ROBERT GOTTSCHALK
Commissioner of Patents